United States Patent
Yamamoto et al.

(10) Patent No.: US 10,996,331 B2
(45) Date of Patent: May 4, 2021

(54) MEASURING APPARATUS AND METHOD

(71) Applicant: KABUSHIKI KAISHA TOSHIBA, Minato-ku (JP)

(72) Inventors: Daisuke Yamamoto, Kawasaki (JP); Takafumi Sonoura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 398 days.

(21) Appl. No.: 15/900,253

(22) Filed: Feb. 20, 2018

(65) Prior Publication Data
US 2019/0011551 A1    Jan. 10, 2019

(30) Foreign Application Priority Data

Jul. 6, 2017 (JP) .............................. JP2017-132917

(51) Int. Cl.
*G01S 15/00* (2020.01)
*G01S 15/42* (2006.01)
(Continued)

(52) U.S. Cl.
CPC ............ *G01S 15/42* (2013.01); *G01S 3/8022* (2013.01); *G01S 15/32* (2013.01); *G06N 20/00* (2019.01); *G01S 15/931* (2013.01); *G06N 3/08* (2013.01)

(58) Field of Classification Search
USPC .......................................................... 367/99
See application file for complete search history.

(56) References Cited

U.S. PATENT DOCUMENTS 7,796,470 B1 * 9/2010 Lauder .................... F41H 11/00
                                                    367/127
9,176,223 B2 * 11/2015 Derham .................. G01S 13/04
(Continued)

FOREIGN PATENT DOCUMENTS

JP      2000 98031        4/2000
JP      2005-300429      10/2005
(Continued)

OTHER PUBLICATIONS

Katsuhiko Tabata, et al., "Development of Sensors for a Safety Driving system of Electric Wheelchair (2nd Report)—An Ultrasonic Phased-Array Sonar—", Gifu Prefectural Research Institute of Information Technology, Research Report, No. 16, 2014, pp. 18 (with English Translation).

(Continued)

*Primary Examiner* — James R Hulka
(74) *Attorney, Agent, or Firm* — Oblon, McClelland, Maier & Neustadt, L.L.P.

(57) ABSTRACT

According to one embodiment, a measuring apparatus includes an ultrasonic transmitter, an ultrasonic receiver and an estimator. An ultrasonic transmitter transmits, as a transmission signal, an ultrasonic beam in a plurality of directions. An ultrasonic receiver receives, as received signals, reflected waves of the transmission signal from the plurality of directions, one received signal including a plurality of reflected waves when the transmission signal is transmitted to one direction of the plurality of directions. An estimator that estimates range information from the received signals, based on preliminarily obtained received signals and a preliminarily obtained distance to an object.

10 Claims, 14 Drawing Sheets

(51) Int. Cl.
  *G01S 3/802* (2006.01)
  *G01S 15/32* (2006.01)
  *G06N 20/00* (2019.01)
  *G01S 15/931* (2020.01)
  *G06N 3/08* (2006.01)

(56) References Cited

U.S. PATENT DOCUMENTS

| | | | |
|---|---|---|---|
| 9,857,465 B2* | 1/2018 | Steckel | G01S 7/526 |
| 2005/0058021 A1* | 3/2005 | Feintuch | G01S 15/04 |
| | | | 367/99 |
| 2013/0176161 A1 | 7/2013 | Derham et al. | |
| 2014/0122391 A1* | 5/2014 | Mugan | G06N 5/025 |
| | | | 706/12 |
| 2015/0016225 A1 | 1/2015 | Steckel et al. | |
| 2018/0060725 A1* | 3/2018 | Groh | G06N 7/005 |
| 2018/0081372 A1* | 3/2018 | Thoennessen | G05D 1/0088 |
| 2018/0177461 A1* | 6/2018 | Bell | A61B 5/7267 |

FOREIGN PATENT DOCUMENTS

| | | |
|---|---|---|
| JP | 2013-104811 | 5/2013 |
| JP | 2013-539854 | 10/2013 |

OTHER PUBLICATIONS

Santos, V. et al., "Perception for the Local Navigation of a Mobile Robot: a Neural Network Approach", Commission of the European Communities, 1994, 6 pages.

Carmena, J. M. et al., "The use of Doppler in Sonar-based mobile robot navigation: inspirations from biology", Information Sciences, vol. 161, 2004, pp. 71-94.

Santos, V. et al., "Perception Maps for the Local Navigation of a Mobile Robot: a Neural Network Approach", Commission of the European Communities, 1994, 6 pages.

Masotoshi Hamanaka, et al., "Drone Flying Area Estimation Method Based on Deep Learing", w/English Translation, The 30$^{th}$ Annual Conference of the Japanese Society for Artificial Intelligence, 2016, p. 13.

Uji Kaijo, "Sound Symphony Image Sona", Journal of the Acoustical Society of Japan, w/English Translation, vol. 47, No. 1, 1991, p. 16.

* cited by examiner

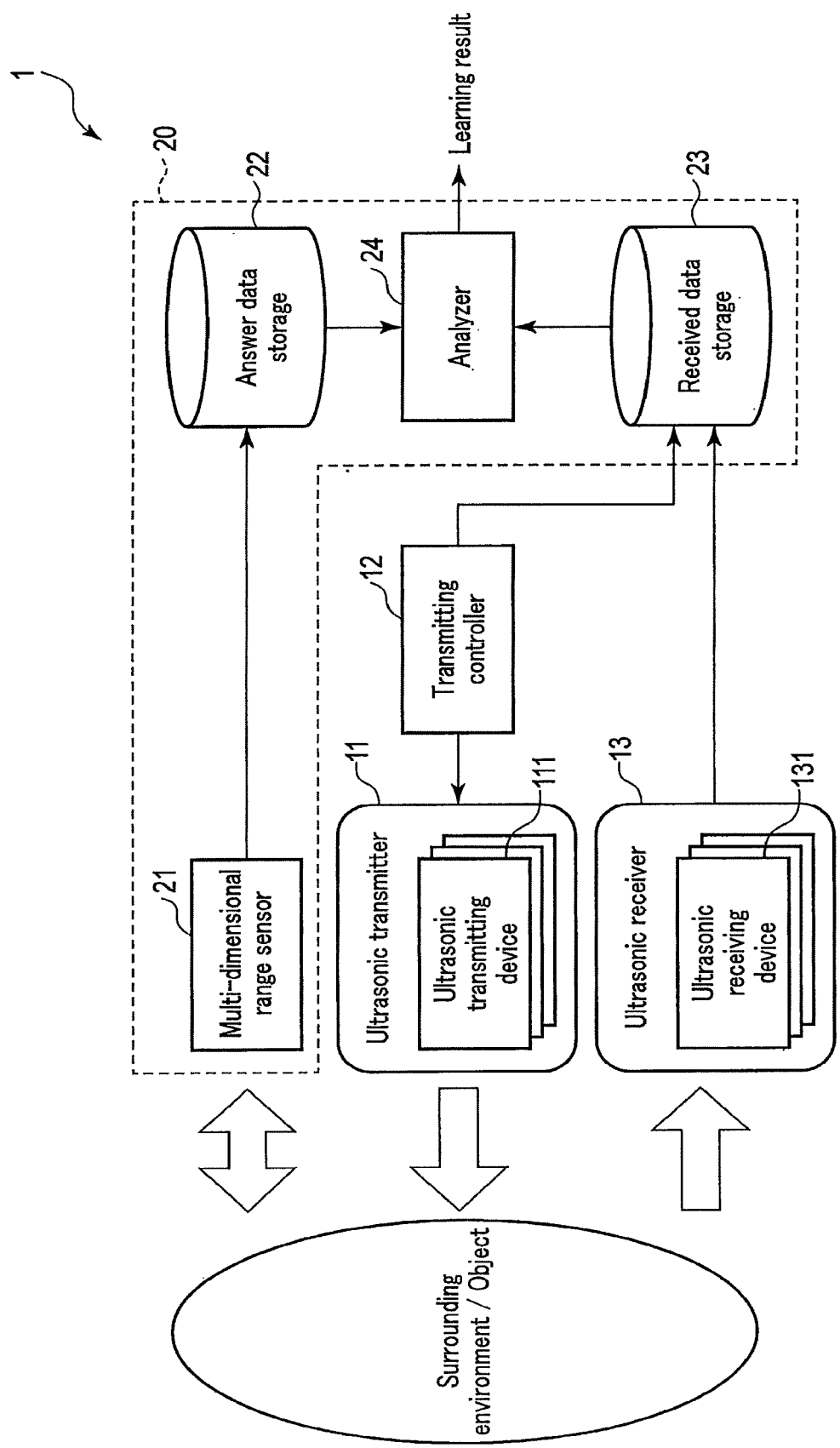
F I G. 1

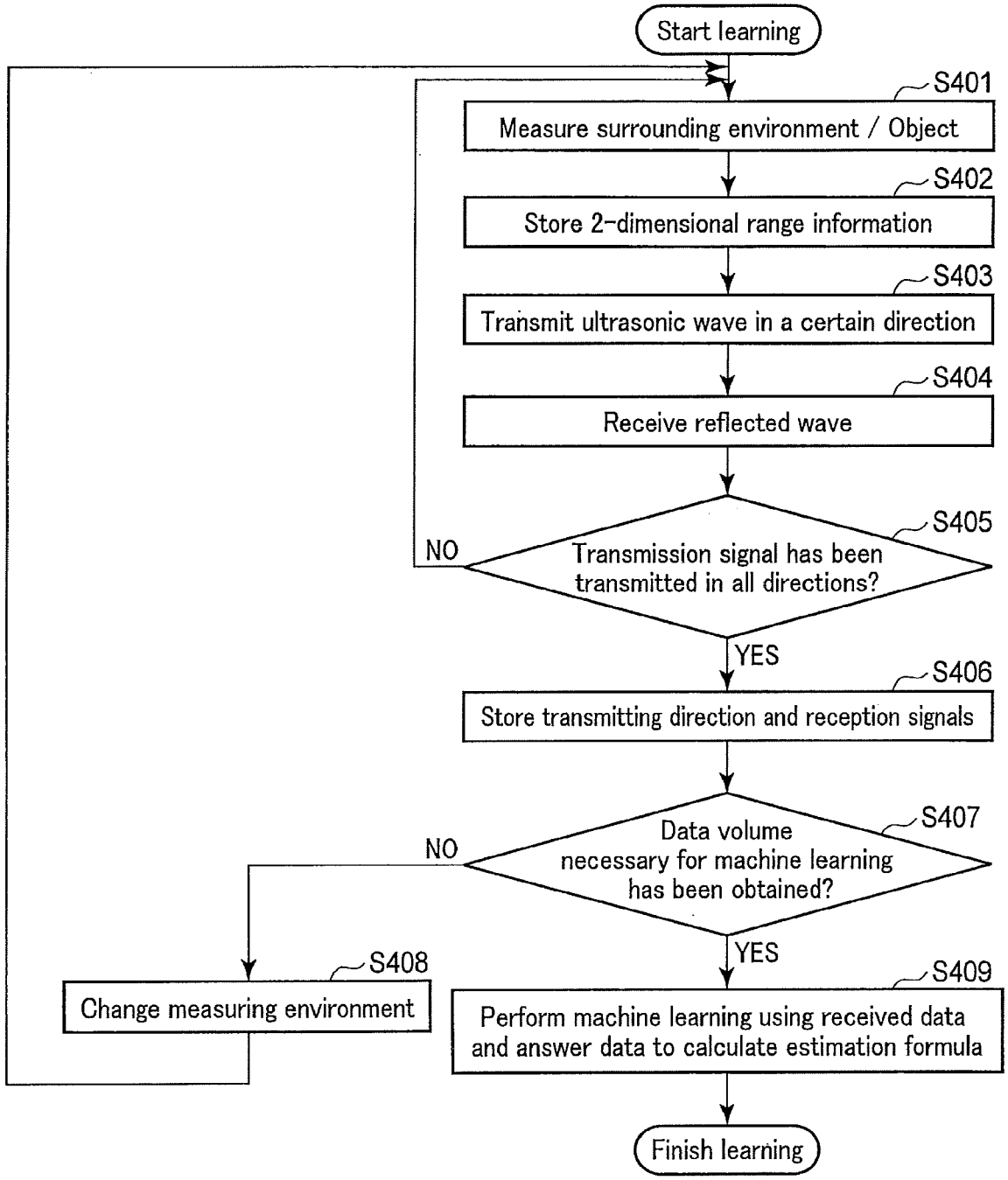
F I G. 4

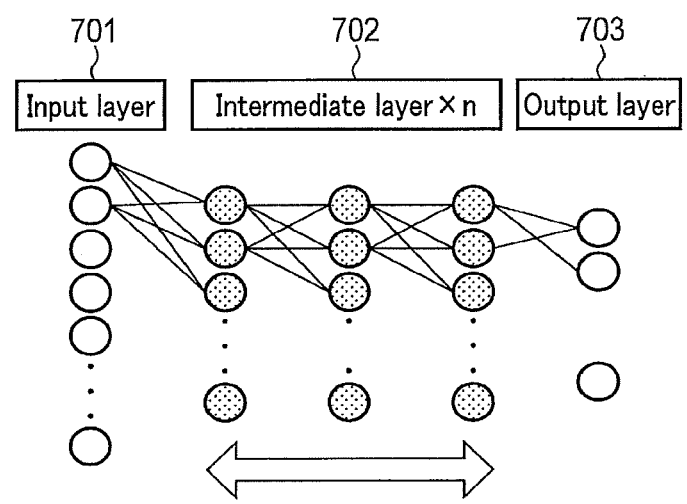
F I G. 7

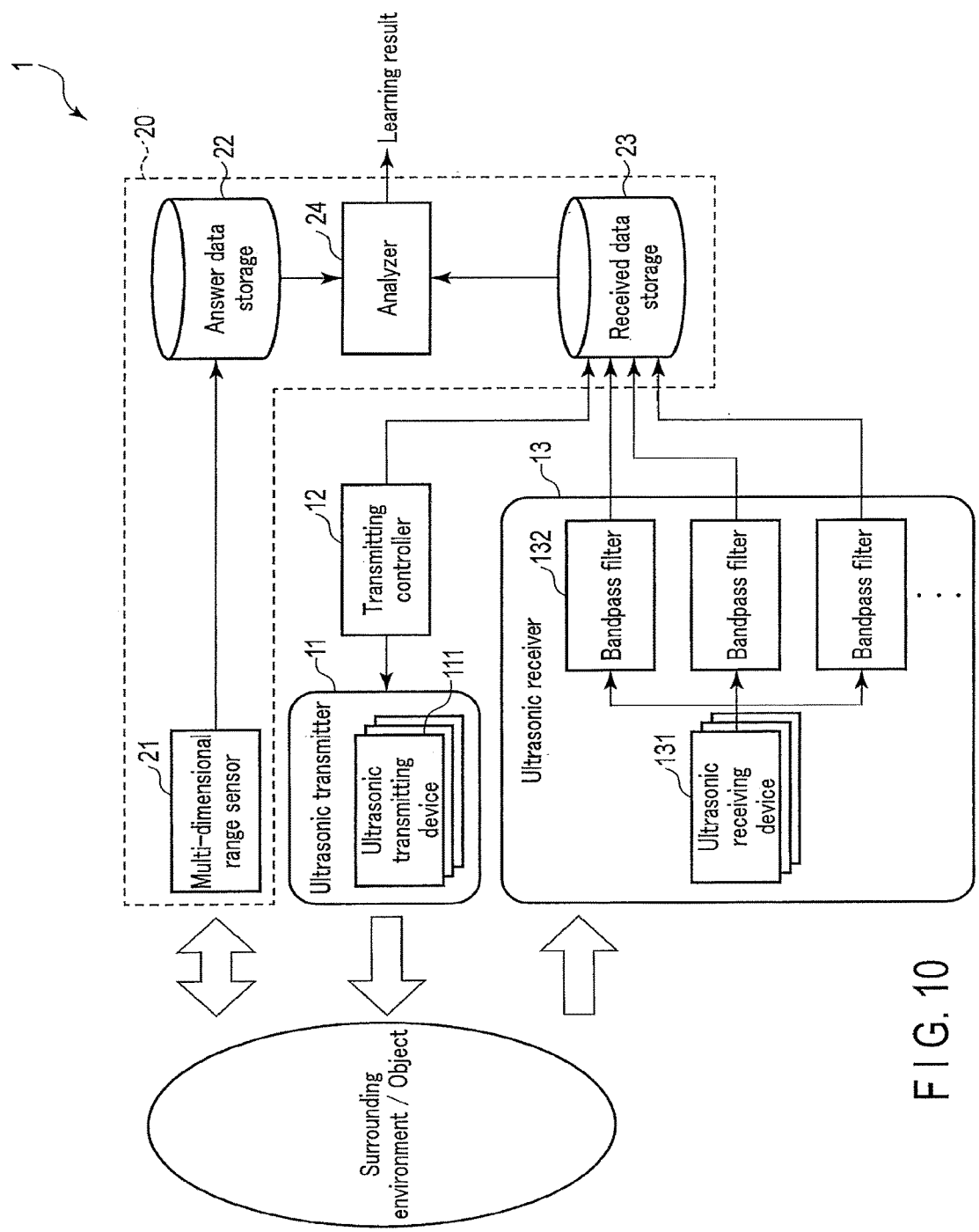
F I G. 10

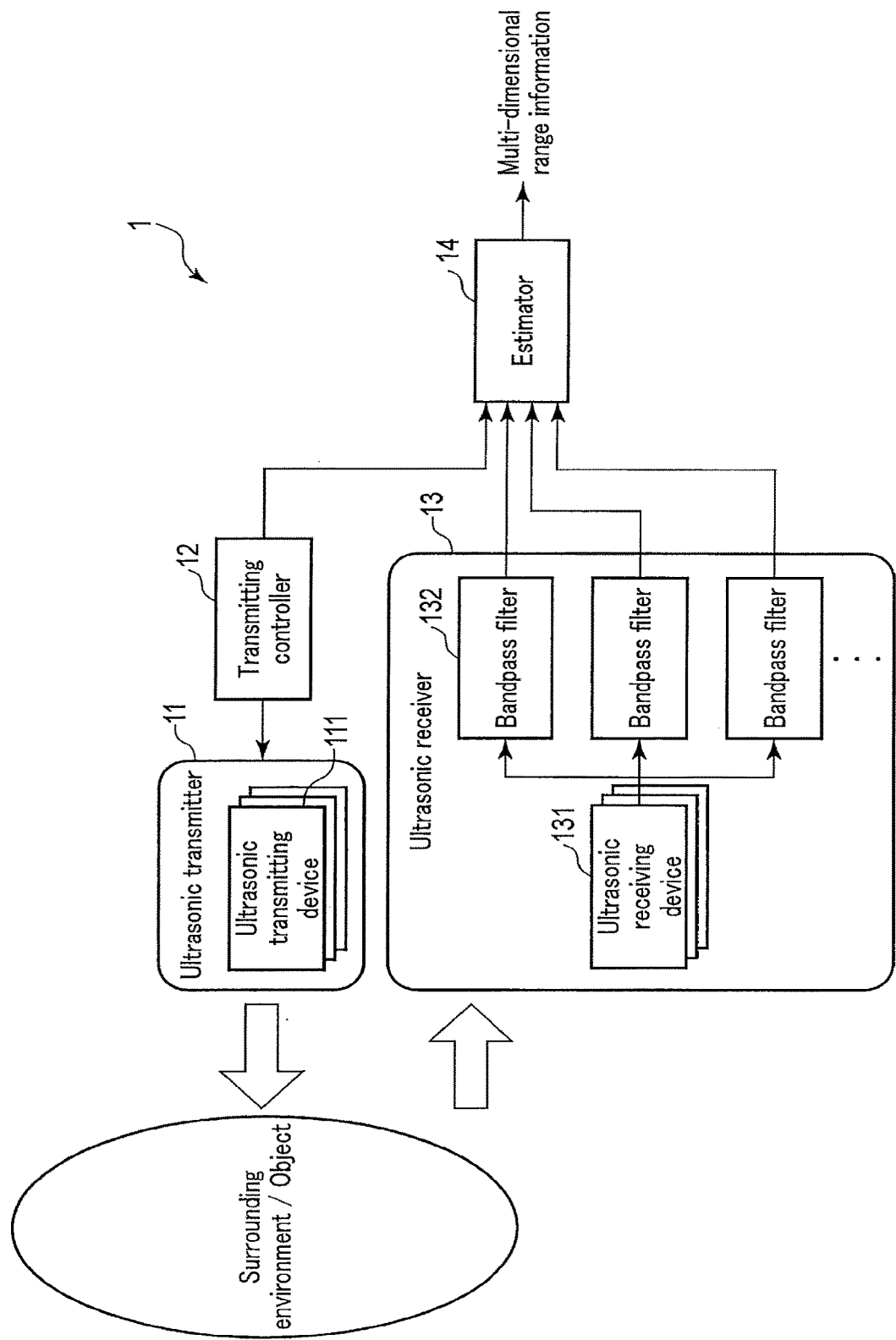
F I G. 11

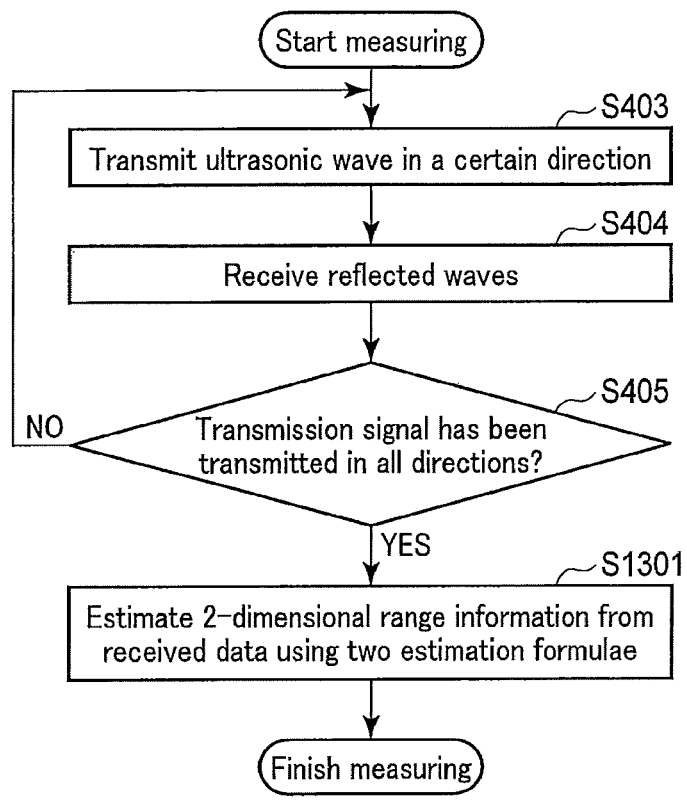
F I G. 13

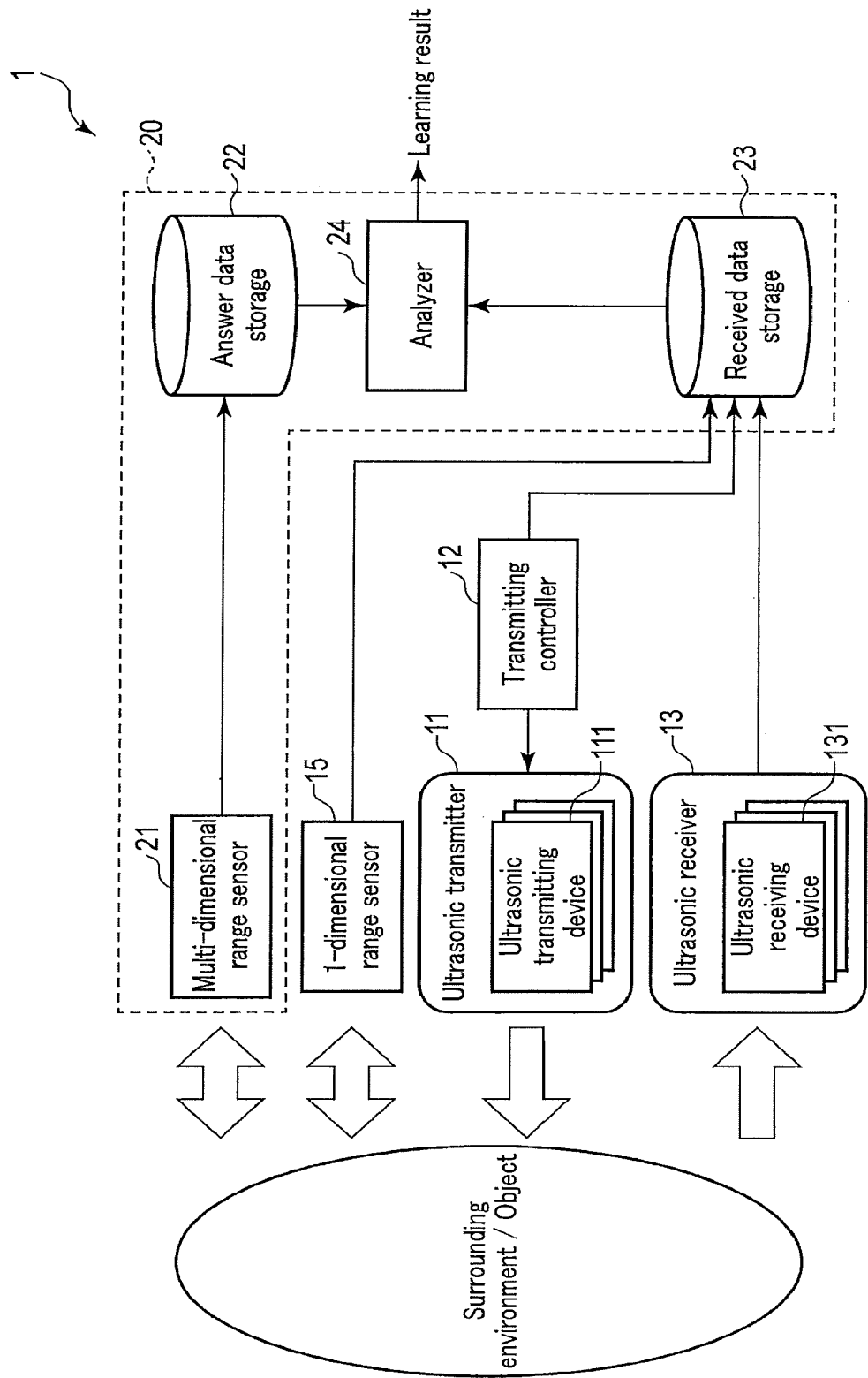
F I G. 14

MEASURING APPARATUS AND METHOD

CROSS-REFERENCE TO RELATED APPLICATIONS

This application is based upon and claims the benefit of priority from Japanese Patent Application No. 2017-132917, filed Jul. 6, 2017, the entire contents of which are incorporated herein by reference.

FIELD

Embodiments described herein relate generally to a measuring apparatus and method.

BACKGROUND

In recent years, demands for 2-dimensional range sensors or 3-dimensional range sensors for use in automatic driving, or detection of an obstacle, or mapping, to be mounted on a mobile robot have been increasing.

Generally, a millimeter-wave radar or camera, etc. is mounted on a vehicle in which an automatic driving function is mounted. As a range sensor for use in a mobile robot, an ultrasonic sensor that detects a distance to the nearest object, a 2-dimensional range sensor such as a laser range finder (LRF), and a 3-dimensional range sensor such as a LiDAR are used, and furthermore, three-dimensional measurements, etc. using a camera have been performed.

However, a sensor using a laser is high in cost. A sensor using an image has a disadvantage of being susceptible to illumination. These 2-dimensional and 3-dimensional range sensors are high in cost as a whole.

BRIEF DESCRIPTION OF THE DRAWINGS

FIG. 1 is a block diagram showing a measuring apparatus according to a first embodiment during machine learning.

FIG. 4 is a flowchart showing an operation when the measuring apparatus according to the first embodiment is machine learning.

FIG. 7 is a schematic diagram of deep learning for use in machine learning.

FIG. 10 is a block diagram showing a measuring apparatus according to a second embodiment during machine learning.

FIG. 11 is a block diagram showing the measuring apparatus according to the second embodiment during measuring.

FIG. 13 is a flowchart showing a measuring operation of the measuring apparatus according to the second embodiment.

FIG. 14 is a block diagram showing a measuring apparatus according to a third embodiment during machine learning.

DETAILED DESCRIPTION

Figure 2:
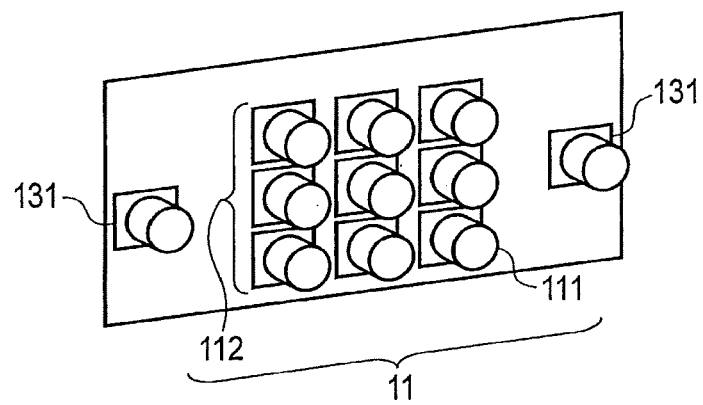
FIG. 2 is a diagram showing an arrangement example of an ultrasonic transmitter and an ultrasonic receiver according to the first embodiment.

In general, according to one embodiment, a measuring apparatus includes an ultrasonic transmitter, an ultrasonic receiver and an estimator. An ultrasonic transmitter transmits, as a transmission signal, an ultrasonic beam in a plurality of directions. An ultrasonic receiver receives, as received signals, reflected waves of the transmission signal from the plurality of directions, one received signal includes a plurality of reflected waves when the transmission signal is transmitted to one direction of the plurality of directions. An estimator that estimates range information from the received signals, based on preliminarily obtained received signals and a preliminarily obtained distance to an object.

Hereinafter, the measuring apparatus and method according to the present embodiment will be described in detail, referring to drawings. Note that in the following embodiments, portions provided with the same reference signs are each regarded as performing almost the same operation, and overlapping explanations thereof are skipped as necessary.

First Embodiment

A measuring apparatus according to a first embodiment will be explained in reference to FIG. 1.

In the present embodiment, the measuring apparatus measures a distance from the measuring apparatus to an object existing around the measuring apparatus in an environment to be measured by the measuring apparatus, for example, before shipment from a factory or in initial measurement. Information on the measured distance is acquired as a learning result. In the subsequent measurements, a case is assumed where the measuring apparatus estimates a distance to an object around the measuring apparatus in the same environment, based on the acquired learning result.

The measuring apparatus according to the first embodiment during learning will be explained in reference to the block diagram shown in FIG. 1.

The measuring apparatus 1 according to the first embodiment includes an ultrasonic transmitter 11, a transmitting controller 12, an ultrasonic receiver 13, a multi-dimensional range sensor 21, an answer data storage 22, a received data storage 23, and an analyzer 24. The multi-dimensional range sensor 21, answer data storage 22, received data storage 23, and analyzer 24 are collectively called a learning module 20.

The multi-dimensional range sensor 21 receives multi-dimensional range information. The multi-dimensional range sensor 21 is a 2-dimensional range sensor, such as a laser range finder (LRF), a 3-dimensional range sensor called a LiDAR (Light Detection and Ranging or Light imaging Detection and Ranging), or a sensor that measures a distance using an image. The multi-dimensional range information is, for example, information in which an angle (or a direction) based on a certain position is correlated with a distance. In the following, an example will be explained where 2-dimensional range information is acquired as multidimensional range information using a 2-dimensional range sensor as a multidimensional range sensor 21.

The answer data storage 22 receives 2-dimensional range information as answer data from the multi-dimensional range sensor 21 and stores the answer data.

The ultrasonic transmitter 11 includes a plurality of ultrasonic transmitting devices 111. The ultrasonic transmitter 11 transmits, as a transmission signal, an ultrasonic beam in which an ultrasonic wave provided with directivity in an azimuth direction, toward surroundings of the measuring apparatus 1, based on control information from the later-mentioned transmitting controller 12.

The transmitting controller 12 generates control information for controlling the transmission signal transmitted from the ultrasonic transmitter 11. The control information is information related to the directivity of an ultrasonic beam, a signal strength, a transmitting direction (transmitting angle) of a transmission signal, transmission timing, etc. The transmitting controller 12 transmits the control information to the ultrasonic transmitter 11 and an estimator 14.

The ultrasonic receiver 13 includes at least one ultrasonic receiving device 131. The ultrasonic receiver 13 receives a reflected wave of a transmission signal reflected by an object existing in the surrounding environment, and obtains a received signal.

The received data storage 23 receives the control information from the transmitting controller 12, and receives the received signal from the ultrasonic receiver 13. The received data storage 23 correlates control information (e.g., transmitting direction) with a received signal and stores the information as received data.

The analyzer 24 receives 2-dimensional range information from the answer data storage 22 and receives received data from the received data storage 23. The analyzer 24 performs machine learning the received data as an input and the 2-dimensional range information as an output, and generates a learning result including an estimation formula. The estimation formula is a function for estimating 2-dimensional range information from received data. The machine learning may be performed using a general technique, for example, a case of an analysis and learning using deep learning or another neural network is assumed; however, other machine learning techniques may be used.

The learning module 20 may be mounted on the measuring apparatus 1, or may be arranged separately from the measuring apparatus 1. After completion of machine learning, the learning module 20 may be configured to be detachable from the measuring apparatus 1 after a learning result is generated.

Next, an arrangement example of the ultrasonic transmitter 11 and the ultrasonic receiver 13 according to the first embodiment will be explained in reference to FIG. 2.

The ultrasonic transmitter 11 is arranged in a portion of the measuring apparatus 1. In the example shown in FIG. 2, nine ultrasonic transmitting devices 111 are arranged near a center portion of a side surface of the measuring apparatus 1. The ultrasonic transmitting devices 111 are each, for example, an ultrasonic sensor including an element generating an ultrasonic wave.

A transmission-phased array is composed of the nine ultrasonic transmitting devices 111. By outputting an ultrasonic wave at the same time with the three ultrasonic transmitting devices 111 in the vertical direction being set as one ultrasonic transmitting device array 112 set, a plane wave ultrasonic beam in a vertical direction is formed, and the ultrasonic beam becomes a transmission signal.

The ultrasonic beam is caused to scan in an azimuth direction by shifting a transmission timing of transmission signals from three sets of ultrasonic transmitting device arrays 112 (creating a transmission delay). An example of using three ultrasonic transmitting devices 111 as one ultrasonic transmitting device array 112 set is shown; however; the present embodiment is not limited thereto. Four or more ultrasonic transmitting devices may be used to further enhance the directivity of an ultrasonic beam, or two ultrasonic transmitting devices 111 may be used.

On the other hand, the ultrasonic receiver 13 is arranged on the same plane on which the ultrasonic transmitter 11 is provided. In an example of FIG. 2, two ultrasonic receiving devices 131 are provided on the both ends of a side surface of the measuring apparatus 1. The ultrasonic receiving devices 131 may also be composed of, for example, ultrasonic sensors, as with the ultrasonic transmitter 111.

A reception-phased array is composed of two ultrasonic receiving devices 131. When two ultrasonic receiving devices 131 are used, a reception time interval difference can be provided relative to reflected waves by placing the ultrasonic receiving devices 131 apart in a horizontal direction. The number of the ultrasonic receiving devices 131 is not limited to two. One ultrasonic receiving device 131, or three or more ultrasonic receiving devices 131 may be placed.

The arrangement of the ultrasonic transmitter 11 and the ultrasonic receiver 13 is not limited to the example shown in FIG. 2, and may be any arrangement, as long as they are placed at positions where the surrounding environment can be measured. An ultrasonic sensor capable of combination use of transmission and reception may be used without separating ultrasonic waves for transmission and for reception as shown in FIG. 2.

Next, a scanning example of a transmission signal in the ultrasonic transmitter 11 according to the first embodiment will be explained in reference to FIG. 3.

The ultrasonic transmitter 11 transmits a transmission signal which is to be in the form of an impulse waveform once or plural times. After transmitting the transmission signal once, the processing is transferred to a reception time period. The ultrasonic receiver 13 stops transmission of the ultrasonic wave and continues receiving a reflected wave during the reception time period, on the basis of a round-trip time period of the maximum attainment distance in the measurement environment.

Figure 3:
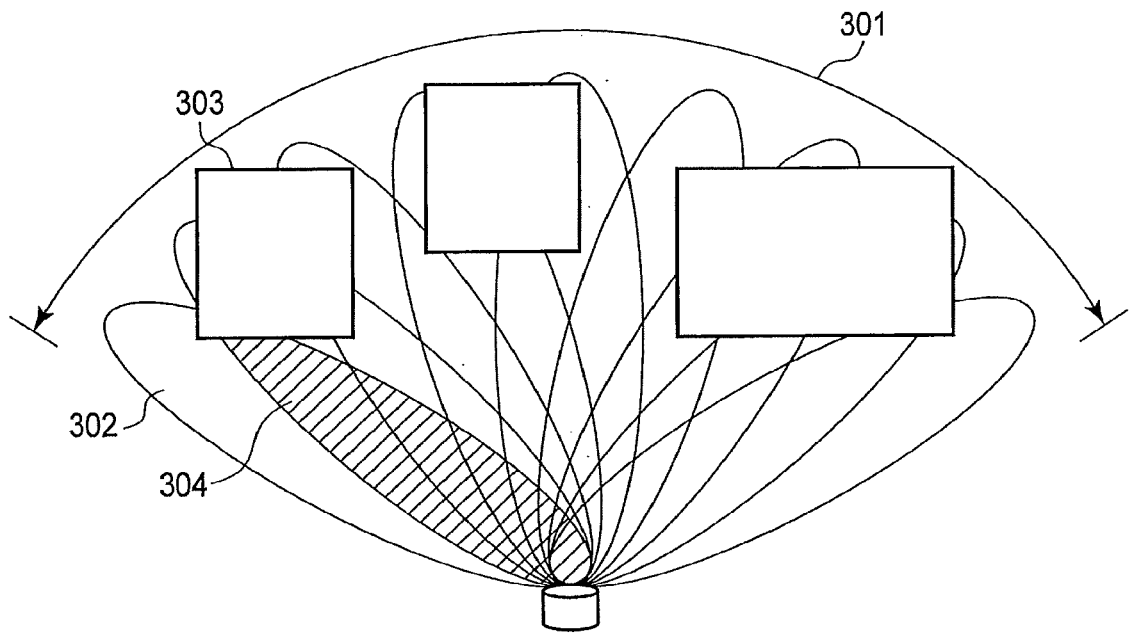
FIG. 3 is a diagram showing a scanning example of a transmission signal in the ultrasonic transmitter according to the first embodiment.

As shown in FIG. 3, the measuring apparatus 1 according to the present embodiment performs a scanning operation with a transmitting beam 302 in nine directions within a scanning range of ±45 degrees with respect to a front direction of the ultrasonic transmitter 11. That is, the scanning direction of the transmitting beam is successively changed by 10 degrees. The transmission signal is reflected by an object 303, and a received signal as a reflected wave can be obtained. The received signal is received by two ultrasonic receiving devices 131, and thus two received signals can be obtained in the transmission in one direction. As a result, one received data includes 18 received signals (nine directions×two received signals=18). A measuring range 301 is not limited to the scanning range of ±45 degrees, and may be set at a user's discretion.

In adjacent transmitting beams 302, the scanning operation is performed so that portions in the range of the beam overlap one another. That is, an overlapping range 304 is formed between each transmitting beam 302. With this configuration, scanning can be carried out without omission in the measuring range 301.

Next, the operation during learning of the measuring apparatus 1 according to the first embodiment will be explained in reference to the flowchart shown in FIG. 4.

The measuring apparatus 1 measures a distance between the measuring apparatus itself and an object around the measuring apparatus in a given measuring range.

In step S401, the multi-dimensional range sensor 21 measures a surrounding environment and acquires 2-dimensional range information at least within the measuring range.

In step S402, the answer data storage 22 acquires the 2-dimensional range information as answer data.

In step S403, the ultrasonic transmitter 11 transmits a transmission signal in one transmitting direction within a given measuring range, based on control information. The measuring range may be included in the control information.

In step S404, the ultrasonic receiver 13 receives, as a received signal, reflected waves of the transmission signal transmitted in step S403.

In step S405, the transmitting controller 12 determines whether or not the transmission signal has been transmitted in all directions within the measuring range. If the transmission in all of the directions has been completed, the processing proceeds to step S406, and if the transmission in all of the directions has not yet been completed, the processing returns to step S403 to repeat the same processing.

In step S406, the received data storage 23 correlates a transmitting direction with a received signal in the transmitting direction and stores them as a set of received data.

In step S407, the analyzer 24 determines whether or not a data volume necessary for machine learning has been acquired. With respect to the determination of a data volume necessary for machine learning, the analyzer 24 may determine that a necessary data volume has been obtained, for example, if the number of acquired learning data 603 is equal to or more than a threshold.

If data necessary for machine learning has been acquired, the processing proceeds to step S409. If the data necessary for machine learning has not yet been acquired, the processing proceeds to step S408 to further acquire data.

In step S408, an environment to be measured is changed. This is because received data in various environments is obtained to perform machine learning. As a method to change an environment of a measurement subject, the measuring apparatus 1 may be manually moved, or the measuring apparatus 1 may be mounted on a mobile robot so that an environment of the measurement subject is automatically changed by causing the mobile robot to move appropriately every time one measurement is finished. In contrast, the measuring apparatus 1 may be fixed so that the environment of the measurement subject is changed by moving an object existing around the measuring apparatus 1. Afterward, the processing returns to step S401 to repeat the same processing.

In step S409, the analyzer 24 performs machine learning using the received data and the answer data, and calculates an estimation formula as a learning result. With the above processing, the operation of the measuring apparatus 1 during learning is finished.

It is sufficient that a correlation between answer data and received data when the measuring apparatus 1 has measured at a certain position is ensured, and the order of steps is not limited to the order in which measuring processing by an ultrasonic wave is performed after the measuring processing by 2-dimensional range sensors. That is, the measurement by 2-dimensional sensors may be performed after the measurement processing by an ultrasonic wave, or the measurement by 2-dimensional range sensors and the measurement by ultrasonic sensors may be performed at the same time.

Figure 5:
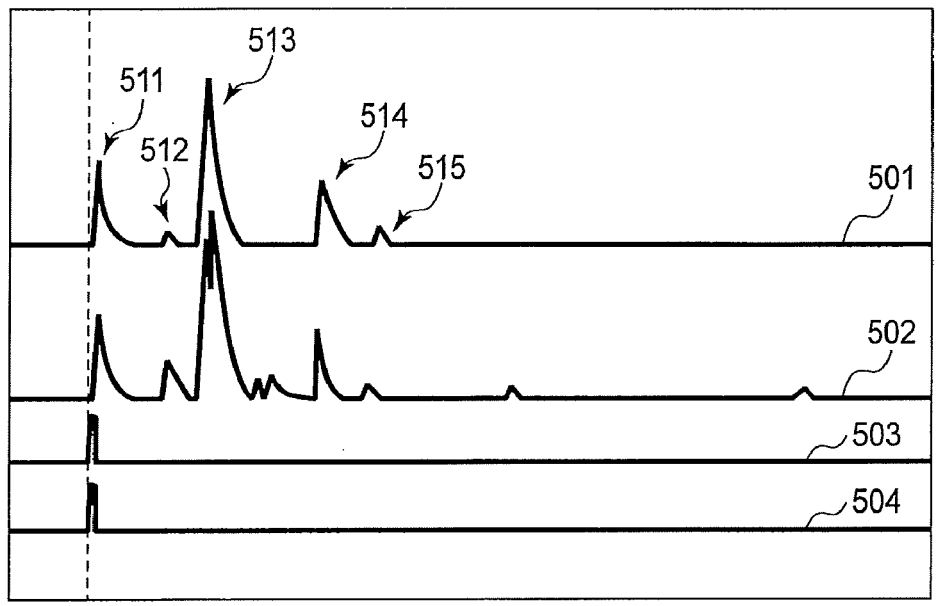
FIG. 5 is a diagram showing one example of signal waveforms of received signals.

FIG. 5 is time-series data (may be referred to as waveform data) of signal strength of a received signal corresponding to a transmission signal transmitted in a certain direction. The vertical axis shows the signal strength, and the horizontal axis shows an elapsed time. From the top of the waveform data, 501 denotes waveform data of a received signal obtained by a first ultrasonic receiver; 502 denotes waveform data of a received signal obtained by a second ultrasonic receiver; 503 denotes waveform data of a transmission signal from an ultrasonic transmitting device array of the right row; and 504 denotes waveform data of a transmission signal from an ultrasonic transmitting device array of the center row.

If explained in the time-series, first, as shown in the waveform data 503 and the waveform data 504, an ultrasonic pulse is transmitted as a transmission signal.

A first peak 511 (local maximum value) of the waveform data 501 and the waveform data 502 is a peak attributable to a transmission signal directly received by the ultrasonic receiving devices 131 without being reflected anywhere. A second peak 512 is a peak attributable to a reflected wave from the floor. A third peak is a maximum peak, which is attributable to a reflected waveform from the nearest object in the surrounding environment. A fourth peak 514 and a fifth peak 515 are peaks assumed to be attributable to reflected waves from the second and the third nearest objects in the surrounding environment.

In the present embodiment, waveform data can be obtained which includes information that cannot be obtained only with a first reflected wave by using not only a value of the peak 513 which is a reflected wave from the nearest object but also using even the values of the peak 514 and peak 515 as received signals. The waveform data may be a waveform of a signal value of the received signal that is received by the ultrasonic receiving device 131, or may be an envelope waveform obtained by detecting an envelope of a signal value of the received signal, or may be an aggregate of respective peak values.

Next, a conceptual diagram of machine learning at the analyzer will be explained in reference to FIGS. 6 and 7.

Figure 6:
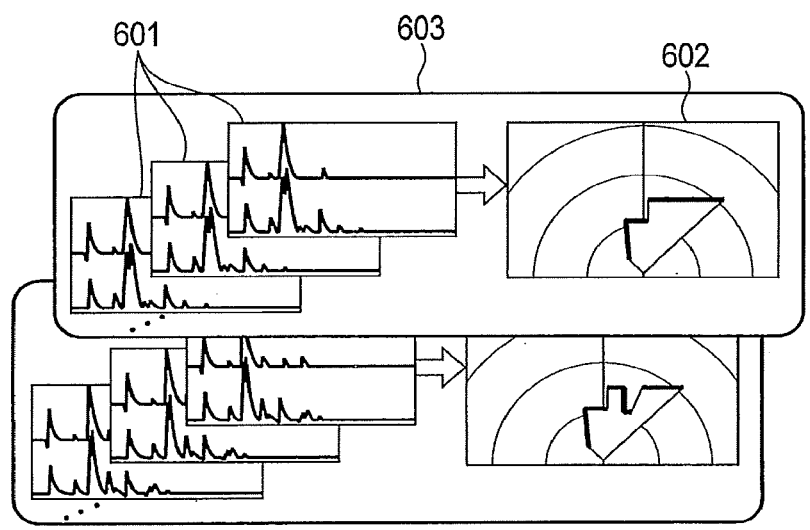
FIG. 6 is a conceptual diagram of learning data according to the present embodiments.

FIG. 6 is a conceptual diagram of learning data according to the present embodiment.

The analyzer 24 performs machine learning by using, as learning data 603, a pair of a received data group (a group of waveforms) 601 of each direction (nine directions in the present embodiment) and corresponding 2-dimensional range information 602 as answer data. Note that in the present embodiment, the 2-dimensional range information 602 is displayed as a map where a distance from a starting point to an object on a 2-dimensional plane is plotted at each azimuth angle around the starting point, however; the 2-dimensional range information is not limited thereto, and may be a set of data where directional information (or coordinate information) is correlated with range information. The starting point corresponds to a position of the multi-dimensional range sensor 21.

The measuring apparatus 1 acquires a plurality of such learning data 603 while changing a surrounding environment to be measured to acquire a data volume necessary for machine learning. Afterward, the analyzer 24 performs machine learning to calculate an estimation formula as a learning result.

FIG. 7 is a schematic diagram of deep learning for use in machine learning.

Deep learning is a technique of machine learning using a multi-layer neural network and includes an input layer 701, a plurality of intermediate layers 702, and an output layer 703, and is characterized in that the plurality of intermediate layers 702 are present.

It is common that in the multi-neural network, data is associated with one another only between one layer and another layer. The multi-layer neural network assumed in the present embodiment is a feedforward type where data proceeds toward the input layer 701, the intermediate layers 702, and the output layer 703 in this order, and data is not fed back to the input layer 701.

The analyzer 24 causes the multi-layer neural network to perform machine learning based on learning data which is a pair of a group of received data of each direction and corresponding 2-dimensional range information as answer data and calculates an estimation formula for estimating answer data from the group of received data.

Figure 8:
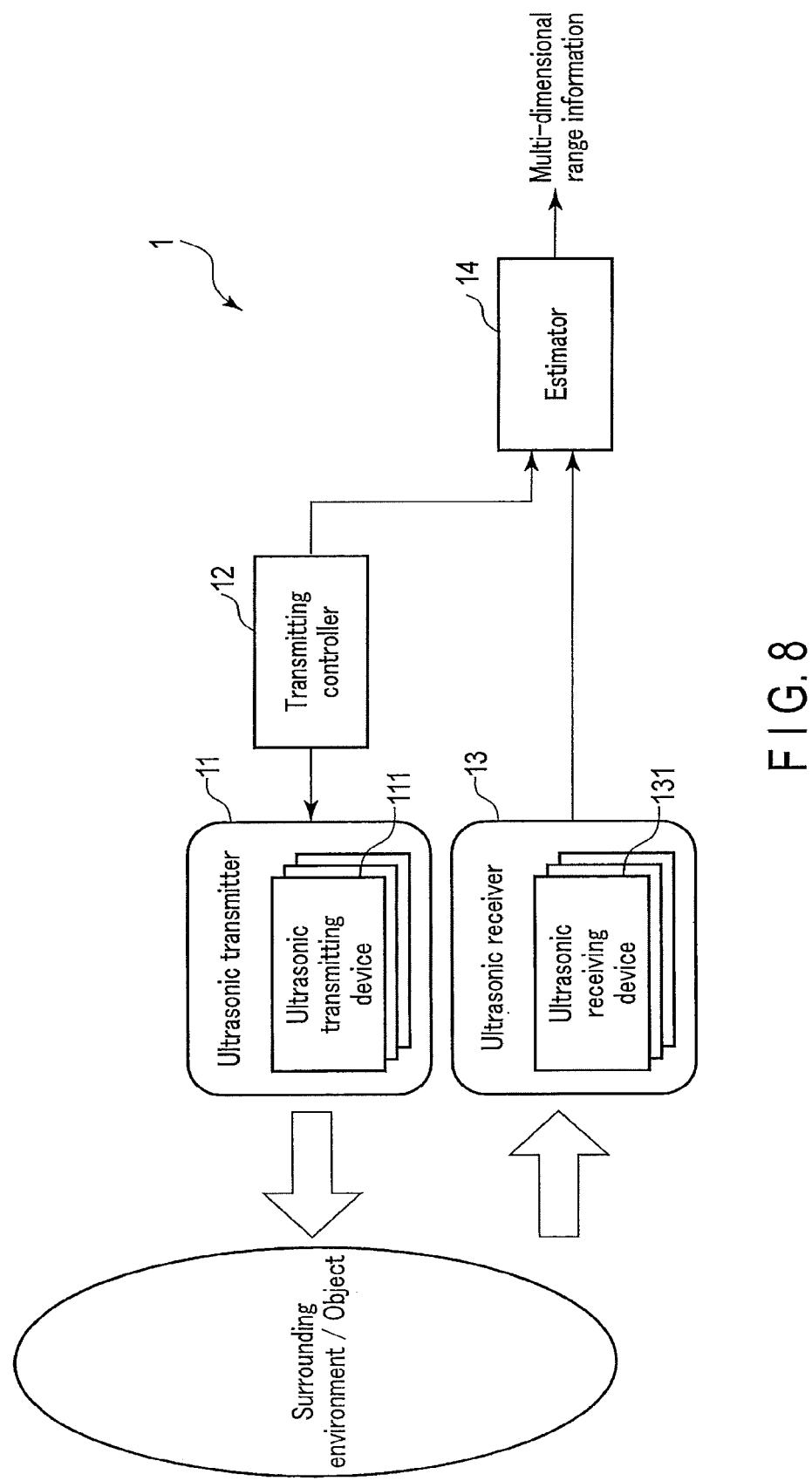
FIG. 8 is a block diagram showing a measuring apparatus 1 according to the first embodiment during measuring.

Next, the measuring apparatus 1 according to the first embodiment during measuring will be explained in reference to the block diagram shown in FIG. 8.

The measuring apparatus 1 according the first embodiment during measuring includes an ultrasonic transmitter 11, a transmitting controller 12, an ultrasonic receiver 13, and an estimator 14.

The estimator 14 estimates range information from a received signal presently measured based on preliminarily obtained received signals and information on a distance to an object. Specifically, the estimator 14 receives control information from the transmitter controller 12, which has been obtained from the analyzer 24, and receives a received signal from the ultrasonic receiver 13. The estimator 14 estimates range information corresponding to a transmitting direction based on control information related to a transmission signal transmitted across the measuring range, received data, and an estimation formula. The range information is information related to the transmitting direction of the transmission signal, and a distance between the nearest object and the measuring apparatus 1. 2-dimensional range information obtained by a 2-dimensional range sensor may be used as range information.

Figure 9:
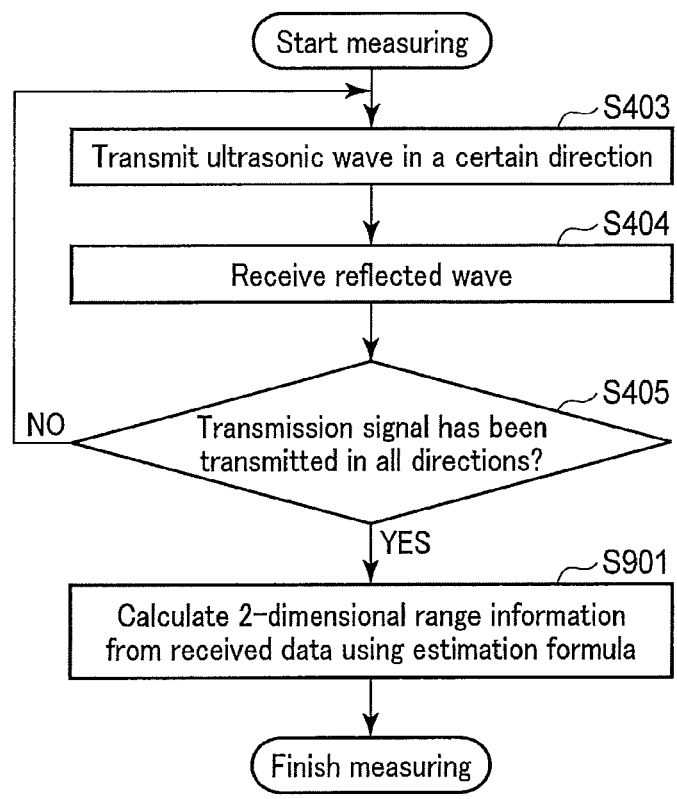
FIG. 9 is a flowchart showing a measuring operation of the measuring apparatus according to the first embodiment.

Next, the operation of the measuring apparatus during measuring will be explained in reference to the flowchart shown in FIG. 9.

The measuring apparatus 1 performs processing from step S403 to step S405 for a surrounding environment to be measured.

In step S901, the estimator 14 estimates 2-dimensional range information from transmitting directions of all directions in the measuring range and received signals, based on an estimation formula.

After the 2-dimensional range information is estimated, the estimated 2-dimensional range information is transmitted externally. As an example of use of estimated 2-dimensional range information, for example, a map generator (not illustrated) that has received 2-dimensional range information may generate a distance map where 2-dimensional range information is depicted on a plane view, and a display (not illustrated) may display the distance map. The distance map may be used in identification of self-position of the measuring apparatus.

According to the first embodiment described above, the measuring apparatus 1 performs machine learning using received signals including a plurality of reflected waves, as a reflected wave of a transmission signal to determine an estimation formula. That is, values of reflected waves from objects other than the nearest object are included as information in waveform data, even if the values thereof cannot be extracted independently of the waveform data. Therefore, a highly accurate estimation formula can be determined by having the measuring apparatus perform machine learning without reducing the information volume of waveform data formed from such a surrounding environment.

Furthermore, by using a calculated estimation formula, 2-dimensional range information can be accurately calculated from received data obtained by measuring a surrounding environment. Accordingly, a measuring apparatus that acquires 2-dimensional or 3-dimensional range information can be realized by low-cost implementation. That is, a highly accurate measuring apparatus can be realized by low-cost implementation using ultrasonic waves.

Second Embodiment

In a second embodiment, a case is assumed where a surrounding environment is measured in a state where an object around the measuring apparatus 1 or the measuring apparatus 1 itself is moving. For example, if the measuring apparatus 1 comes near to the object in the surroundings, the frequency (may be referred to as a transmission frequency) of a transmission signal becomes higher than the frequency of a reflected wave due to the Doppler Effect. In contrast, if the measuring apparatus 1 gets away from the object in the surroundings, the transmission frequency of the transmission signal becomes lower than the frequency of a reflected wave.

Therefore, the second embodiment differs from the first embodiment in that a received signal is separated into signals having a plurality of frequency bands to perform machine learning with the respective signals, and an estimation formula is calculated for each of the signals having the plurality of frequency bands.

The measuring apparatus 1 according to the second embodiment during learning will be explained in reference to the block diagram shown in FIG. 10. The measuring apparatus 1 during measuring will be explained in reference to the block diagram shown in FIG. 11.

The operations of the measuring apparatus 1 according to the second embodiment are the same as in the first embodiment, except for operations other than those of the ultrasonic receiver 13 and the received data storage 23.

The ultrasonic receiver 13 includes a plurality of ultrasonic receiving devices 131 and a plurality of bandpass filters 132.

The plurality of bandpass filters 132 respectively pass only a signal with a specific frequency band for received signals from the ultrasonic receiving devices 131, and generate filtered received-signals.

In the second embodiment, a first filter that passes a signal with the same frequency as the frequency band of a transmission signal, a second filter that passes a signal with a frequency band higher than the frequency band of the transmission signal, and a third filter that passes a signal with a frequency band lower than the frequency band of the transmission signal are used. That is, from one received signal, three filtered received-signals which are different in frequency band are generated.

The range of frequency bands higher than the frequency band of the transmission signal, and the range of frequency bands lower than the frequency band of the transmission signal are not limited thereto. For example, if the measuring apparatus 1 itself moves, frequency bands to be extracted may be determined based on the moving speed of the measuring apparatus, and if an object present in the surrounding environment moves, frequency bands to be extracted may be determined based on the moving speed, etc. of the object.

The received data storage 23 receives the filtered received-signals that have passed through each of the bandpass filters of the ultrasonic receiver 13 and stores them as a set of received data.

Figure 12:
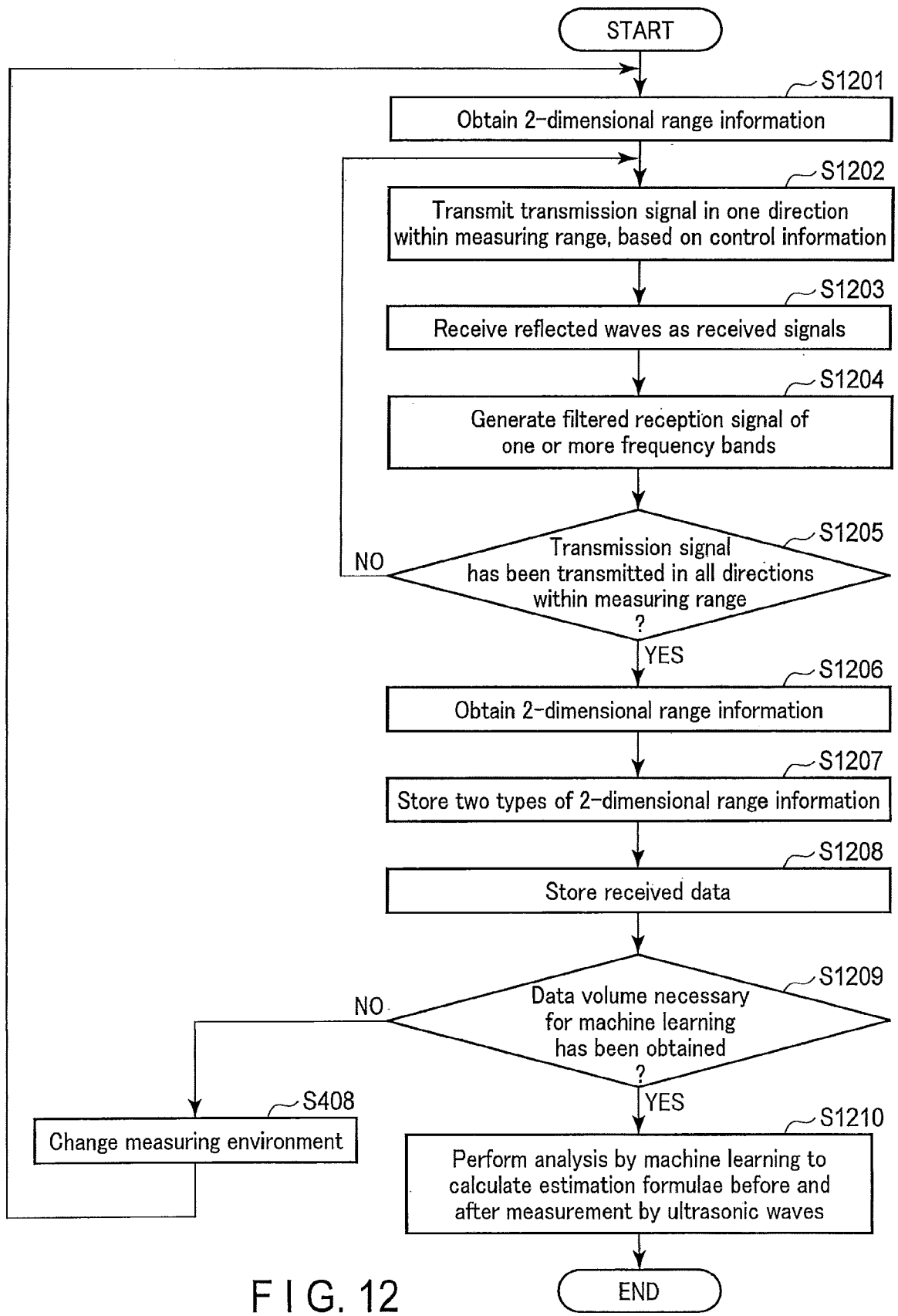
FIG. 12 is a flowchart showing a learning operation of the measuring apparatus according to the second embodiment.

Next, the operation of the measuring apparatus 1 according to the second embodiment during learning will be explained in reference to the flowchart shown in FIG. 12.

In step S1201, the multi-dimensional range sensor 21 measures a surrounding environment to obtain 2-dimensional range information before measurements by means of ultrasonic waves.

In step S1202, the ultrasonic wave transmitter 11 transmits a transmission signal in one direction within a measuring range, based on control information.

In step S1203, the ultrasonic receiver 13 receives, as a received signal, a reflected wave of the transmission signal transmitted in step S1202.

In step S1204, the plurality of bandpass filters 132 of the ultrasonic receiver 13 generate filtered received-signals with a plurality of frequency bands.

In step S1205, the transmitting controller 12 determines whether or not the transmission signal has been transmitted in all directions within the measuring range. If the transmission in all directions has been completed, the processing proceeds to step S1206, and if the transmission in all directions has not yet been completed, the processing returns to step S1201 to repeat the same processing.

In step S1206, after the measurement using ultrasonic waves, the multi-dimensional range sensor 21 measures the surrounding environment again to acquire 2-dimensional range information.

In step S1207, the answer data storage 22 stores the 2-dimensional range information. That is, two types of answer data obtained before and after the measurement using ultrasonic waves are stored in the answer data storage 22.

In step S1208, the received data storage 23 correlates a transmitting direction with a filtered received-signal in the transmitting direction and stores the correlation as received data. Specifically, two ultrasonic receiving devices×nine directions×three filtered received-signals=54 filtered received-signals are stored as a set of received data in the received data storage 23.

In step S1209, the analyzer 24 determines whether or not a data volume necessary for machine learning has been obtained. If data necessary for machine learning has been acquired, the processing proceeds to step S1210, and if data necessary for machine learning has not yet been acquired, the processing returns to step S1201 and repeats the same processing to further acquire data.

In step S1210, the analyzer 24 performs an analysis based on the machine learning using the received data and answer data to calculate an estimation formula before the measurement using ultrasonic waves and an estimation formula after the measurement using ultrasonic waves. With the operations described above, the operations of the measuring apparatus 1 according to the second embodiment are finished.

Next, the operation of the measuring apparatus 1 during measuring according to the second embodiment will be explained in reference to the flowchart shown in FIG. 13.

Step S403, Step S404, and Step S405 are the same as in the first embodiment.

In Step S1301, the estimator 14 estimates 2-dimensional range information before and after the measurement using ultrasonic waves, based on the received data and the two estimation formulae.

According to the second embodiment presented above, the measuring apparatus performs machine learning based on received signals in a plurality of frequency bands and estimates estimation formulae. With this configuration, measuring apparatus that acquires 2-dimensional or 3-dimensional range information can be realized by low-cost implementation as with the first embodiment, even when the measuring apparatus itself moves, and even when moving objects are present.

Third Embodiment

The third embodiment differs from the above-mentioned embodiments in that data measured by a 1-dimensional range sensor (e.g., a laser range sensor) capable of measuring a distance in one direction is included in received data.

Figure 15:
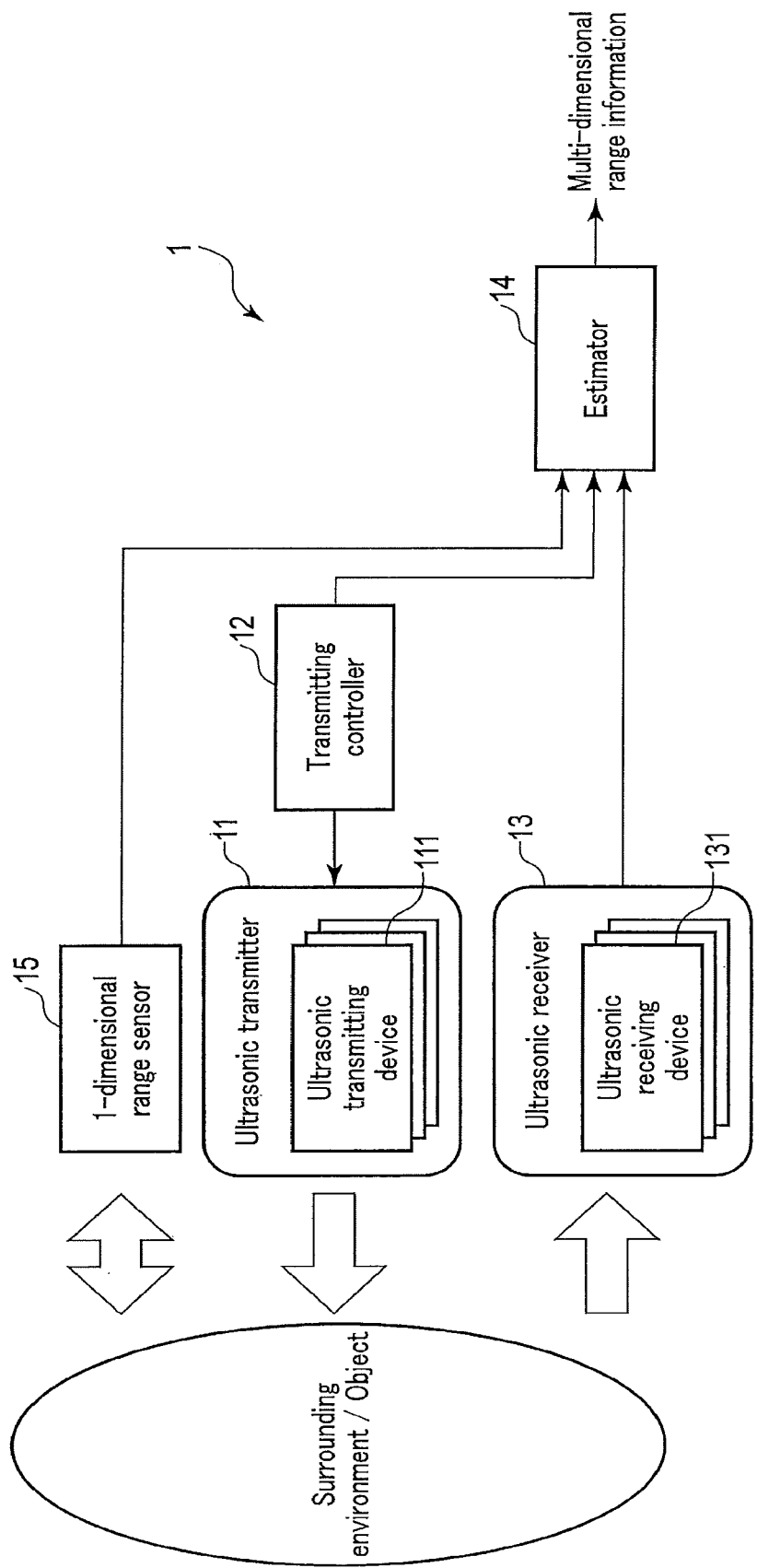
FIG. 15 is a block diagram showing a measuring apparatus according to the third embodiment during measuring.

The measuring apparatus 1 according to the third embodiment during learning, and the measuring apparatus 1 during measuring will be explained respectively in reference to the block diagram shown in FIG. 14 and the block diagram shown in FIG. 15.

The measuring apparatus 1 according to the third embodiment includes a 1-dimensional range sensor 15 in addition to the measuring apparatus according to the first embodiment during measuring.

The 1-dimensional range sensor 15 includes a transmitter (not-illustrated) that transmits a laser, and a receiver (not-illustrated) that receives a laser reflected from an object. The 1-dimensional range sensor 15 can measure 1-dimensional range information based on a phase difference between the transmitted laser and the reflected laser or a round trip time therebetween, and generates the 1-dimensional range information.

The received data storage 23 receives the 1-dimensional range information from the 1-dimensional range sensor 15. The received data storage 23 combines a received signal measured once in a measuring range with the 1-dimensional range information to store the combination as a set of received data.

An arrangement example of the 1-dimensional range sensor 15 according to the third embodiment will be explained in reference to FIG. 16.

Figure 16:
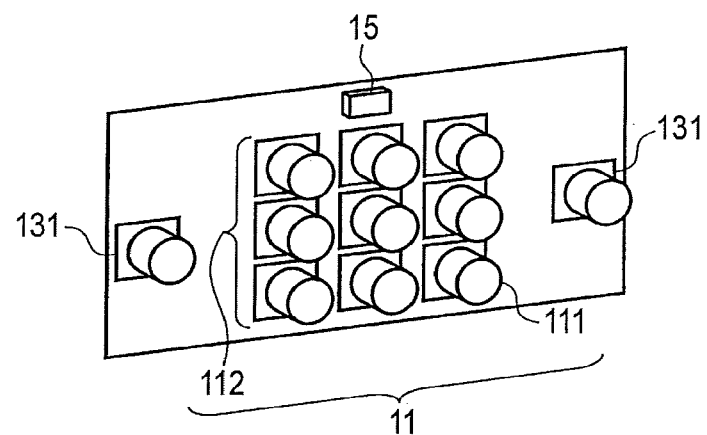
FIG. 16 is a diagram showing an arrangement example of a 1-dimensional range sensor according to the third embodiment.

As shown in FIG. 16, the 1-dimensional range sensor 15 is arranged on the same plane on which the ultrasonic transmitter 11 and the ultrasonic receiver 13 are provided. The 1-dimensional range sensor 15 measures, for example, a distance in one frontward direction to obtain 1-dimensional range information.

Figure 17:
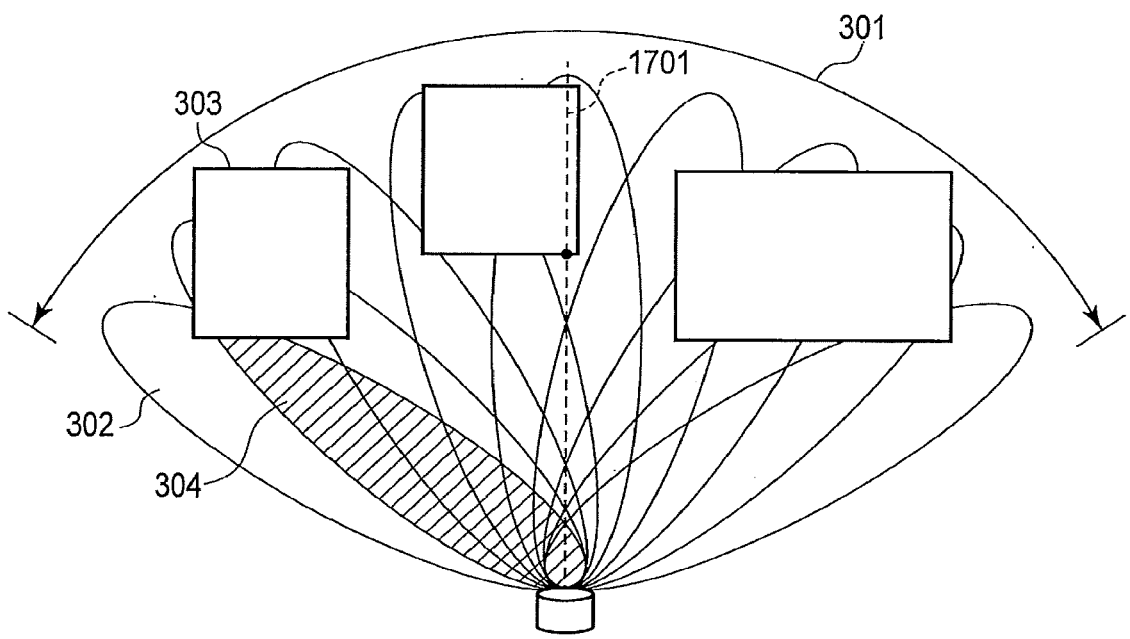
FIG. 17 is a diagram showing a scanning example in an ultrasonic transmitter according to the third embodiment.

Next, a scanning example of the ultrasonic transmitter 11 according to the third embodiment will be explained in reference to FIG. 17.

The 1-dimensional range sensor 15 measures a distance in a front direction by a laser 1701 and acquires highly accurate 1-dimensional range information. On the other hand, a measurement by ultrasonic waves according to the present embodiment is the same as in the above-mentioned embodiments. Not only 1-dimensional information in the front direction but also 1-dimensional range information in any one direction within the measuring range may be acquired by changing the position of the 1-dimensional range sensor 15 to be set.

According to the third embodiment presented above, a distance of a surrounding object in a certain one direction, such as a front direction, is measured accurately by the properties of a laser, and received data obtained using ultrasonic waves and the accurate data are combined together, and the combined data is stored as an input of machine learning. With this configuration, it is considered that the matching accuracy between the input of the machine learning and 2-dimensional range information as answer data is improved, as result, making it possible to improve the accuracy of machine learning and to improve the estimation accuracy of 2-dimensional range information.

In the above-mentioned embodiments, a case of estimating 2-dimensional range information related to a 2-dimensional plane is explained; however, 3-dimensional range information may be estimated by transmitting a transmission signal in an azimuth direction and in a direction of an elevation angle so that reflective waves thereof are received as received signals. In this case, as for the range information to be acquired as answer data, it is advisable to acquire 3-dimensional range information by expanding a measuring range by a 2-dimensional range sensor to a 3-dimensional space.

As explained above, a case is assumed where a learning result is generated by performing machine learning based on data preliminarily obtained in an environment in which the measuring apparatus will measure; however, the configuration is not limited thereto.

For example, a learning result generated based on data measured by a plurality of measuring apparatuses in various environments is stored by uploading in an external server (not illustrated) such as a cloud server. If a certain measuring apparatus performs a measurement, for example, the estimator 14 may acquire (or download), from an external server, a learning result obtained in an environment similar to an environment in which a user wants to measure and read the learning result, and then the measurement may be carried out by the measuring apparatus 1. This configuration makes it possible to skip preliminary learning and to carry out an immediate measurement of a surrounding environment.

The instructions shown in the processing sequence in the above-described embodiment may be executed based on a software program. The same effect as that of the above-described detection apparatus may be obtained by storing the program in a general-purpose computer system in advance, and then reading the program. The instruction described in the above-mentioned embodiment may be recorded as a computer-executable program in a magnetic disk (flexible disk, hard disk, etc.), an optical disk (CD-ROM, CD-R, CD-RW, DVD-ROM, DVD+R, DVD+RW, Blu-ray (registered trademark) Disc, etc.), a semiconductor memory, or a similar type of recoding medium. Any recording format may be employed as long as the format is readable in a computer or an embedded system. The same operation as that of the detection apparatus of the above-described embodiment may be realized when the computer reads the program from the recording medium and the instructions described in the program is executed by the CPU or processing circuitry based on the program. It is a matter of course that the computer may acquire and read the program through a network. In addition, an OS (operation system) running on the computer, a database management software, an MW (middleware) such as a network may perform some of the respect processes based on the instruction of the program stored in the computer or the embedded system from the recording medium for realizing this embodiment. Furthermore, the recording medium in this embodiment is not limited to a medium independent from the computer or the embedded system, and may be a recording medium which downloads the program transferred through a LAN or the Internet, and stores or temporarily stores the program. In addition, the number of recording mediums is not limited to "1". Even a case where the process in this embodiment is performed from a plurality of recording mediums is also included in the case of the recording medium in this embodiment, and any configuration of the medium may be employed.

Further, the computer or the embedded system in this embodiment performs the respective processes in this embodiment based on the program stored in the recording medium, and may be configured by any one of a device such as a personal computer or a microcomputer and a system where a plurality of devices are connected through a network. In addition, the computer in this embodiment is not limited to the personal computer, and includes an arithmetic processing device included in an information processing apparatus, and a microcomputer. The computer in this embodiment collectively refers to an apparatus or a device which can realize the functions in this embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measuring apparatus comprising:
   an ultrasonic transmitter that controls transmission of ultrasonic waves from a plurality of ultrasonic transmitting devices to form an ultrasonic beam having directivity and transmits, as a transmission signal, the ultrasonic beam in a plurality of directions;
   an ultrasonic receiver that receives, as received signals, reflected waves of the transmission signal from the plurality of directions, one received signal including a plurality of reflected waves when the transmission signal is transmitted to one direction of the plurality of directions, the received signals each representing a waveform including a plurality of local maximum values; and
   an estimator that estimates range information from the received signals, based on a multi-layer neural network which is trained using the received signals as input data, and preliminarily obtained received signals and a preliminarily obtained distance to an object as answer data, the multi-layer neural network including a plurality of intermediate layers, each of which includes a plurality of nodes, wherein the nodes are coupled to one another only between different intermediate layers.

2. The apparatus according to claim 1, wherein the ultrasonic transmitter transmits the transmission signal while performing a scanning operation in the plurality of directions so that adjacent portions of the ultrasonic beam overlap.

3. The apparatus according to claim 2, wherein each of the plurality of directions is an azimuth direction in a two-dimensional plane.

4. The apparatus according to claim 2, wherein the plurality of directions is an azimuth direction and a direction of an elevation angle in a three-dimensional space.

5. The apparatus according to claim 1, further comprising:
a plurality of bandpass filters that generate a plurality of filtered received-signals from the received signals by passing a signal having a specific frequency band,
wherein the estimator estimates the range information from the plurality of filtered received-signals, based on a plurality of preliminarily obtained filtered received-signals and a distance to the object before and after measuring using an ultrasonic beam.

6. The apparatus according to claim 1, further comprising:
a one-dimensional range sensor that measures a distance from the apparatus to an object in a given direction to obtain one-dimensional range information,
wherein the estimator estimates the range information from the one-dimensional information and the received signals, based on preliminarily obtained reflected waves from the plurality of directions, preliminarily obtained one-dimensional range information and a preliminarily obtained distance to the object.

7. The apparatus according to claim 1, further comprising:
an analyzer that performs machine learning using the received signals and multi-dimensional range information related to a distance from the apparatus to an object, and generates a learning result including an estimation formula, the multi-dimensional range information being obtained by a multi-dimensional range sensor.

8. The apparatus according to claim 1, wherein the estimator estimates the range information, based on a learning result related to the preliminarily obtained received signals and the preliminarily obtained distance to the object.

9. A measuring method comprising:
controlling transmission of ultrasonic waves from a plurality of ultrasonic transmitting devices to form an ultrasonic beam having directivity;
transmitting, as a transmission signal, the ultrasonic beam in a plurality of directions;
receiving, as received signals, reflected waves of the transmission signal from the plurality of directions, one received signal including a plurality of reflected waves when the transmission signal is transmitted to one direction of the plurality of directions, the received signals each representing a waveform including a plurality of local maximum values; and
performing machine learning on multi-layer neural network which is trained using the received signals as input data and multi-dimensional range information related to a distance from a measuring apparatus to an object as answer data, to generate a learning result including an estimation formula, the multi-dimensional range information being obtained by a multi-dimensional range sensor, the multi-layer neural network including a plurality of intermediate layers, each of which includes a plurality of nodes, wherein the nodes are coupled to one another only between different intermediate layers.

10. A measuring method comprising:
controlling transmission of ultrasonic waves from a plurality of ultrasonic transmitting devices to form an ultrasonic beam having directivity;
transmitting, as a transmission signal, the ultrasonic beam in a plurality of directions;
receiving, as received signals, reflected waves of the transmission signal from the plurality of directions, one received signal including a plurality of reflected waves when the transmission signal is transmitted to one direction of the plurality of directions, the received signals each representing a waveform including a plurality of local maximum values; and
estimating range information from the received signals, based on a multi-layer neural network which is trained using the received signals as input data, and preliminarily obtained received signals and a preliminarily obtained distance to an object as answer data, the multi-laver neural network including a plurality of intermediate layers, each of which includes a plurality of nodes, wherein the nodes are coupled to one another only between different intermediate layers.

* * * * *